United States Patent [19]
Cline

[11] 3,875,617
[45] Apr. 8, 1975

[54] MATERIAL PROTECTOR
[76] Inventor: Marion D. Cline, R.D. 1, Blairsville, Pa. 15117
[22] Filed: Nov. 2, 1973
[21] Appl. No.: 412,416

[52] U.S. Cl.......... 24/16 R; 248/361 A; 280/179 A
[51] Int. Cl.............................................. B60p 7/00
[58] Field of Search .......... 24/16 R, 81 FC, 68 CO; 248/361 A; 105/369 A, 369 R, 369; 280/179 A

[56] References Cited
UNITED STATES PATENTS

| | | | |
|---|---|---|---|
| 968,455 | 8/1910 | Eastabrook | 280/179 A |
| 1,897,138 | 2/1933 | North | 248/361 A |
| 2,772,064 | 11/1956 | Cole | 248/361 A |
| 3,637,234 | 1/1972 | Thomas et al. | 280/179 A |

Primary Examiner—Donald A. Griffin
Attorney, Agent, or Firm—Berman, Bishoff & Platt

[57] ABSTRACT

A tie-down protector for rolls of strip metal consisting of a one-piece angularly bent metal corner bracket shaped to engage on an inside corner of a roll and having an apertured upstanding right-angled tab portion to receive a hold-down chain therethrough.

5 Claims, 5 Drawing Figures

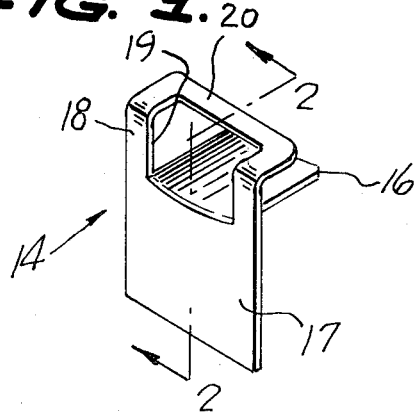
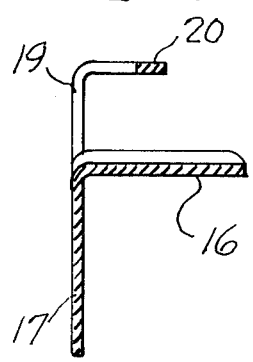
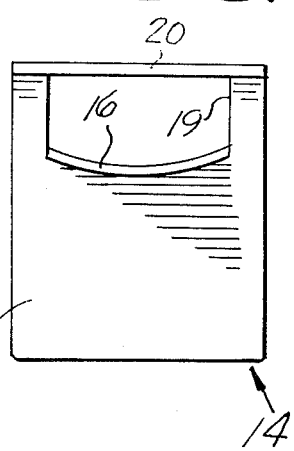
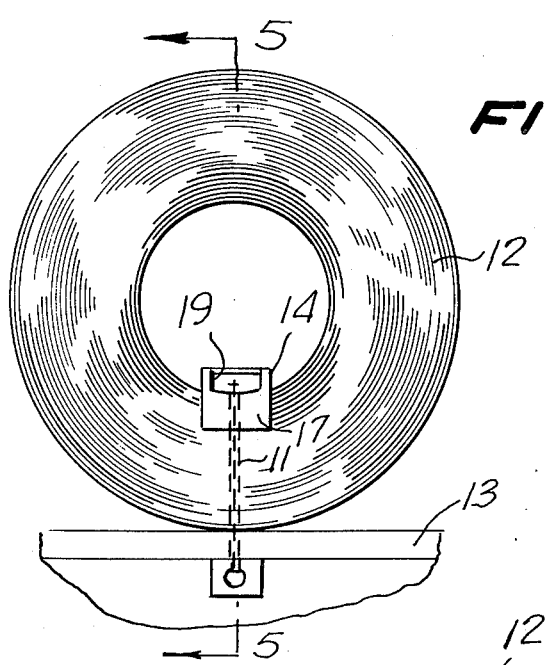
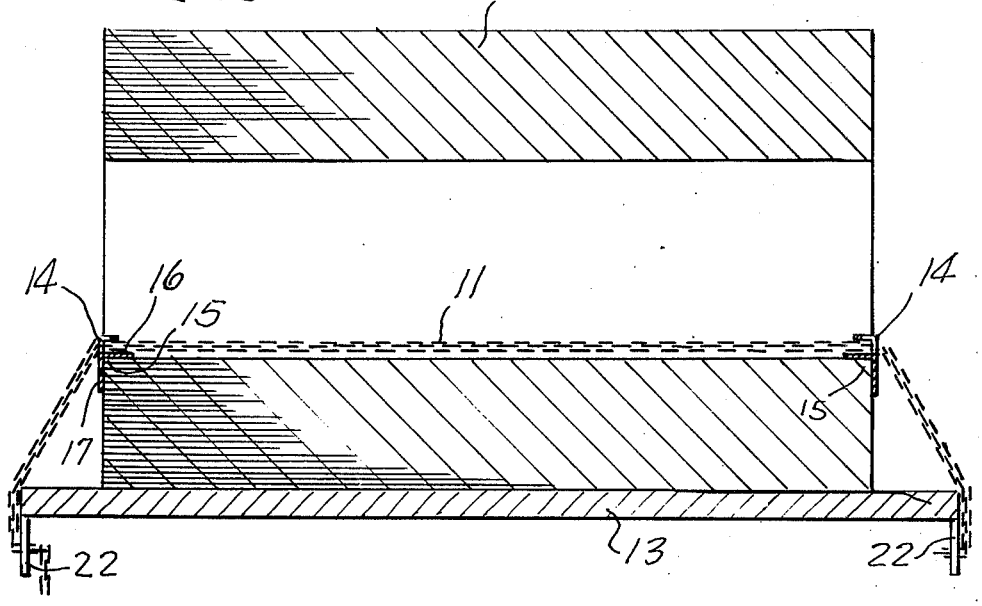

MATERIAL PROTECTOR

This invention relates to edge proctectors for material tied down for shipping, and more particularly to a tie-down protector for protecting the inside corner edges of rolls of strip metal against damage from the tie-down chains or other tied down fastening elements used to tie down the rolls to a vehicle bed.

A main object of the invention is to provide an improved tie-down protector for a roll of strip metal or the like, which is employable to keep the tie-down member such as a chain, or the like, in place while a roll is being transported, protecting the layers of metal in the roll from being damaged at the point where it is tied or banded, and providing an efficient bearing means for the tie-down chain at the inside corner area of the roll.

A further object of the invention is to provide an improved tie-down protector adapted to be employed with a tie-down chain passed through the inside of a roll of strip steel, or the like, acting to protect the inside layers of the steel strip from being damaged at the corner edge portions where the tie-down chains pass thereover, the tie-down protector being very simple in construction, being easy to install, being of one-piece construction so that it is manufacturable from relatively inexpensive material and by relatively simple forming operations, and being substantially interengagable with the links of a tie-down chain so as to aid in retaining it in desired working position.

A further object of the invention is to provide an improved protective corner bracket element for tieing down a roll of strip metal or the like to a vehicle bed and acting to prevent damage to the layers of metal at the inside corner portions over which the tie-down chain or similar member passes, the protector device being very inexpensive to manufacture, being durable in construction, and being especially adapted for fabrication by mass production methods.

Further objects and advantages of the invention will become apparent from the following description and claims, and from the accompanying drawings, wherein:

FIG. 1 is a perspective view of an improved tie-down protector constructed in accordance with the present invention.

FIG. 2 is an enlarged transverse vertical cross-sectional view taken substantially on line 2—2 of FIG. 1.

FIG. 3 is a front elevational view of the tie-down protector of FIGS. 1 and 2.

FIG. 4 is an end elevational view of a roll of steel strip tied down to a vehicle bed and employing tie-down protectors such as those illustrated in FIGS. 1, 2 and 3.

FIG. 5 is a vertical cross-sectional view taken substantially on line 5—5 of FIG. 4.

The common practice in the steel industry and in other industries is to ship rolls of strip metal supported on vehicle beds, and it is necessary to tie down the rolls to the beds in order to prevent undesired shifting of the rolls. Thus, as seen in the drawings, a common expedient is to pass one or more hold-down chains 11 longitudinally through the hollow central portion of the roll 12 and to tie down the ends of the chain to the vehicle bed 13. When hold-down chains 11 are employed in this manner, it is necessary to protect the inside corner portions of the roll against damage inasmuch as the hold-down action of the chain 11 requires that considerable force be exerted on the inside corner portions of the roll to prevent the rolls from shifting undesirably during transportation. Hence, it has been found necessary to provide some adequate protective bearing means to suitably distribute the force at the inside corner portions of the roll to prevent damage to said inside corner portion.

In accordance with the present invention, a pair of bearing bracket members 14 are employed at the opposite inside corner portions 15, 15 of a roll 12 through which the chain 11 passes. Each protector bracket 14 comprises a one-piece angularly bent body of sheet steel, or other suitable material, having a tongue portion 16 struck outwardly therefrom substantially at right angles to the main body 17 of the bracket, thereby defining an upstanding apertured tab element 18 provided with the generally rectangular aperture 19. The flange or tongue element 16 is suitably formed so as to have a downwardly convex curvature which is substantially conformable with the inside curvature of a roll 12, said curvature being clearly shown in FIG. 3. The upper portion of the upstanding apertured tab element 18 is likewise bent perpendicularly relative to the main body 17 of the protector and overlies the flange 16. The overlying portion, shown at 20, includes the upper portion of the aperture 19 defined by striking out the flange 16. Thus, as shown in FIG. 2, the overlying portion 20 is bent so as to extend substantially parallel to the flange portion 16, and includes the upper end portion of the aperture 19, as above-mentioned.

In using a pair of corner protectors 14 in the typical manner illustrated in the drawings, said protectors are engaged over the inside corner portions of the roll 12 and the chain 11 is engaged through the apertures 19 of the protectors, the ends of the chain being secured to the bed 13 in any suitable manner, for example, by using appropriate brackets 22, 22 secured to the opposite edges of the bed 13. As will be readily understood, sufficient tension is provided in the chain 11 to securely hold the right-angled protector brackets 14 against the inside corner portions of the roll 12, the corner portions being protected against damage by the covering provided by the bodies 17 and flanges 16 of the brackets 14, 14. Said brackets are of substantial area and act to efficiently distribute the loading on the corner portions to thereby avoid damage to the layers of rolled metal adjacent thereto. With tension in the chain 11, the links adjacent the right angles defined at the lower edges of the apertures 19 of the brackets substantially interlock with the brackets and firmly hold the brackets 14 in working positions. Since the flange elements 16 are downwardly convex in contour, they substantially conformably fit against the inside of the roll 12 and thereby improve the force-distributing characteristics of the protector brackets 14.

The apertured upstanding tab element 18 not only acts as a retainer ring or loop to keep the chain 11, or other holddown means which may be employed, in place, but the bent over portion 20 also acts as a guard means to cover the adjacent portions of the chain 11 and to thereby prevent cutting or tearing of a tarpaulin or other covering member which may be employed to cover the roll 12.

As will be readily apparent, since the members 14 are formed as one-piece elements from sheet metal, or similar material, they can be made very cheaply, and are especially adaptable for manufacture by die and punch press operation, being manufacturable either from individual blanks or from coil strip metal material.

While a specific embodiment of an improved tie-down protector for rolls of strip metal has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tie-down protector for a roll of material comprising a one-piece angularly bent body engagable on an inside corner of a roll and having an upstanding apertured tab element adapted to receive a flexible hold-down member therethrough, said body including an inwardly extending flange projecting substantially perpendicularly therefrom at the lower edge of the aperture in the body, the top portion of the upstanding tab element being bent to extend substantially parallel to said flange.

2. The tie-down protector of claim 1, and wherein said bent top portion includes a portion of the aperture in the body.

3. A tie-down protector for a roll of material comprising a one-piece angularly bent body engagable on an inside corner of a roll and having an upstanding apertured tab element adapted to receive a flexible hold-down member therethrough, said body including an inwardly extending flange projecting substantially perpendicularly therefrom at the lower edge of the aperture of the body, said flange having a downwardly convexed transverse curvature and being struck from said body to define said aperture, the top portion of said upstanding tab element being bent to extend substantially parallel to said flange.

4. The tie-down protector of claim 3, and wherein the bent top portion of the upstanding tab element overlies said flange.

5. The tie-down protector of claim 4, and wherein said bent top portion includes part of the aperture of the tab elements.

* * * * *